US009764262B2

(12) United States Patent
Koenig et al.

(10) Patent No.: US 9,764,262 B2
(45) Date of Patent: Sep. 19, 2017

(54) ROLLING CONTAINER SYSTEM

(71) Applicant: Wello, Canton, MI (US)

(72) Inventors: Cynthia Koenig, Queens, NY (US); Noel Wilson, San Francisco, CA (US)

(73) Assignee: WELLO, Canton, MI (US)

( * ) Notice: Subject to any disclaimer, the term of this patent is extended or adjusted under 35 U.S.C. 154(b) by 161 days.

(21) Appl. No.: 14/424,851

(22) PCT Filed: Aug. 29, 2013

(86) PCT No.: PCT/US2013/057404
§ 371 (c)(1),
(2) Date: Feb. 27, 2015

(87) PCT Pub. No.: WO2014/036329
PCT Pub. Date: Mar. 6, 2014

(65) Prior Publication Data
US 2015/0231540 A1    Aug. 20, 2015

Related U.S. Application Data

(60) Provisional application No. 61/696,037, filed on Aug. 31, 2012.

(51) Int. Cl.
*B65D 1/12* (2006.01)
*B01D 35/02* (2006.01)
(Continued)

(52) U.S. Cl.
CPC ............ *B01D 35/02* (2013.01); *B01D 35/26* (2013.01); *B65D 1/12* (2013.01); *B65D 1/20* (2013.01);
(Continued)

(58) Field of Classification Search
None
See application file for complete search history.

(56) References Cited

U.S. PATENT DOCUMENTS 2,622,851 A * 12/1952 Minor ................... F25D 31/006
165/46
3,441,141 A * 4/1969 Eicher ................... B01D 29/01
210/241
(Continued)

FOREIGN PATENT DOCUMENTS

GB    1 476 638 A    6/1977
GB    2 325 451 A    11/1998
(Continued)

OTHER PUBLICATIONS

International Search Report mailed Jan. 10, 2014, for PCT Application No. PCT/US2013/057404, filed Aug. 29, 2013, nine pages.

*Primary Examiner* — Chester Barry
(74) *Attorney, Agent, or Firm* — Morrison & Foerster LLP

(57) ABSTRACT

This relates to a rolling water container system that can, in various examples, be used to gather, transport, filter, store and dispense liquids such as water. The rolling water container system according to various examples of the disclosure can provide easier transportation of the water, lifting of the water container or drum, and accessibility to the inside of the drum. Additional features can assist with conservation of water by preventing water leakage from the drum and providing for near-complete emptying of the drum. Further features can include handles with greater mechanical strength.

27 Claims, 18 Drawing Sheets

(51) Int. Cl.
    *B01D 35/26*     (2006.01)
    *B65D 1/20*     (2006.01)
    *B65D 25/28*     (2006.01)
    *B65D 85/72*     (2006.01)

(52) U.S. Cl.
    CPC ............ *B65D 25/28* (2013.01); *B65D 85/72* (2013.01); *B65D 2525/285* (2013.01)

(56) References Cited

U.S. PATENT DOCUMENTS

| | | | |
|---|---|---|---|
| 3,864,710 A * | 2/1975 | Zuber | G03D 13/046 396/573 |
| 4,605,499 A | 8/1986 | Wise | |
| 5,628,420 A * | 5/1997 | Hendrikse | B29C 33/0033 220/4.04 |
| 5,826,926 A * | 10/1998 | Levey | B65G 7/12 294/116 |
| 5,895,991 A | 4/1999 | Butz | |
| 2011/0084006 A1 | 4/2011 | Wu | |
| 2012/0011881 A1 | 1/2012 | Cho et al. | |

FOREIGN PATENT DOCUMENTS

| | | |
|---|---|---|
| WO | WO-2008/068643 A2 | 6/2008 |
| WO | WO-2014/036329 A1 | 3/2014 |

\* cited by examiner

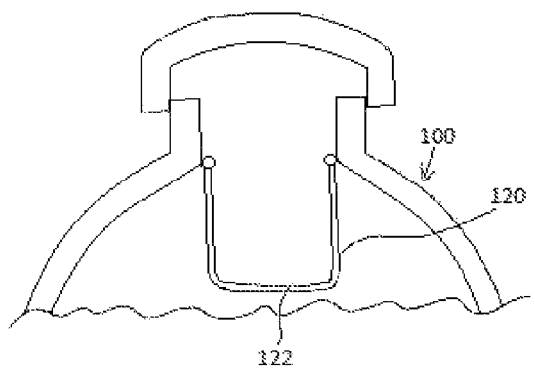
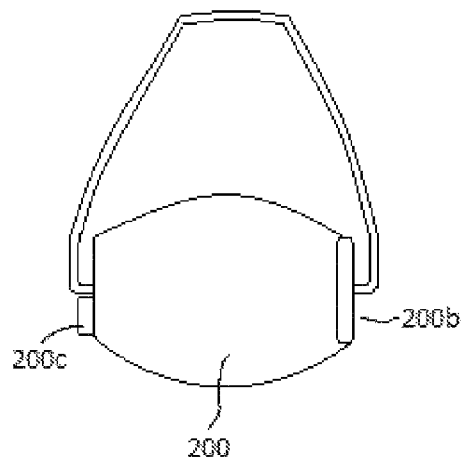
FIG. 16          FIG. 17
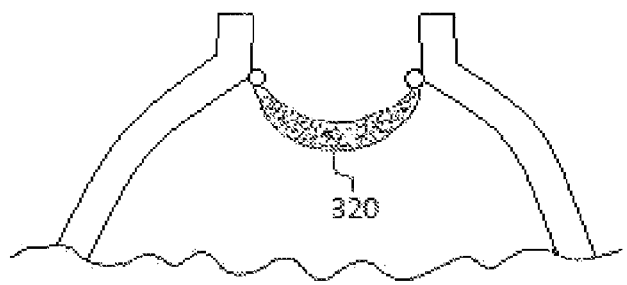
FIG. 18
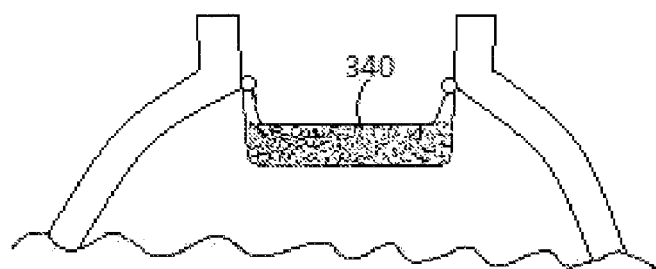
FIG. 19

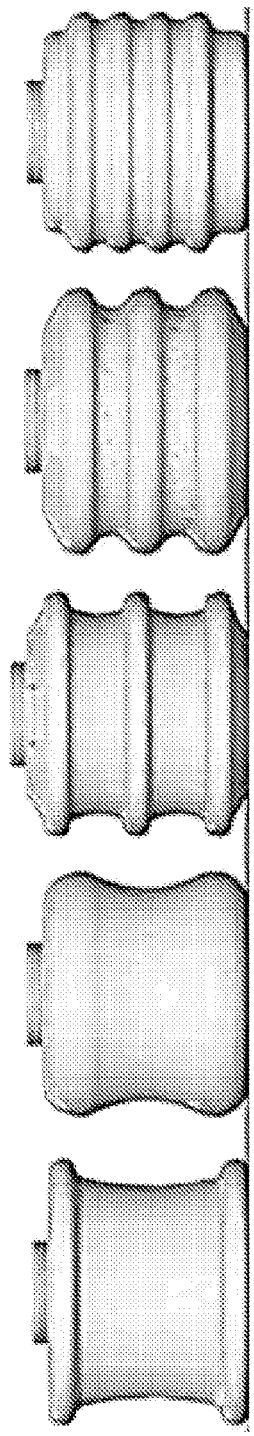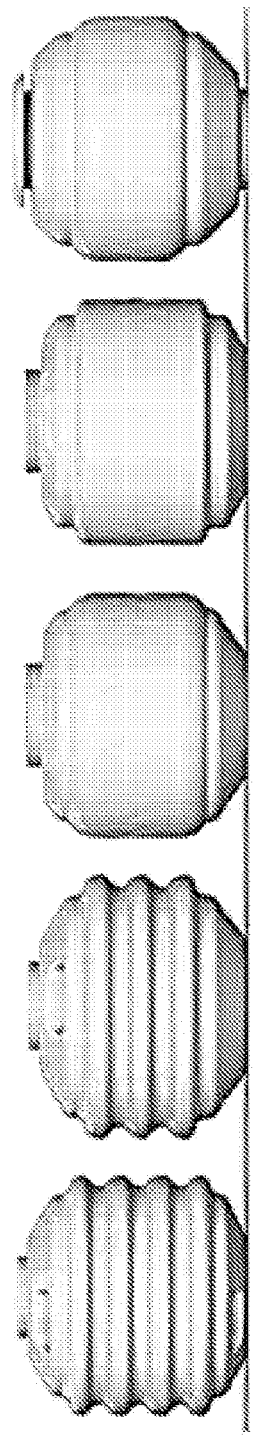
FIG. 28a  FIG. 28b  FIG. 28c  FIG. 28d  FIG. 28e  FIG. 28f  FIG. 28g  FIG. 28h  FIG. 28i  FIG. 28j

FIG. 31
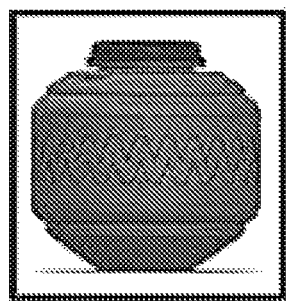 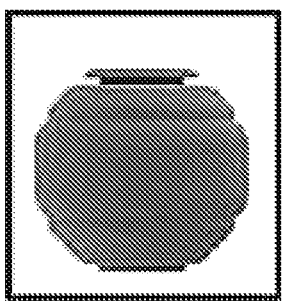 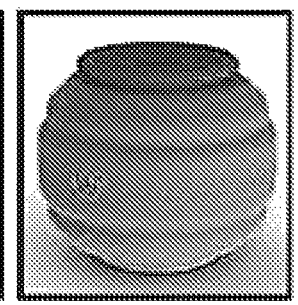
FIG. 32a   FIG. 32b   FIG. 32c
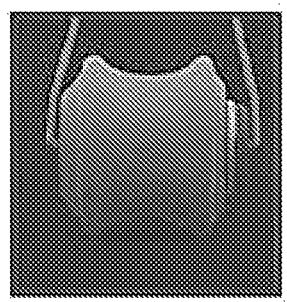 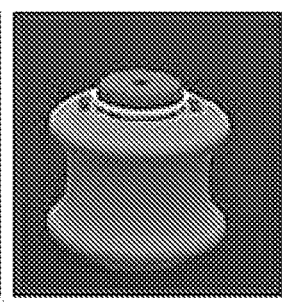
FIG. 32d   FIG. 32e

ROLLING CONTAINER SYSTEM

FIELD OF THE DISCLOSURE

This relates generally to the improvement of the accessibility, mechanical strength, and capabilities of a rolling container system used in the transporting, purification, dispensing and storage of liquids such as water.

BACKGROUND OF THE DISCLOSURE

For some people in developing countries, liquids, such as water, are not easily accessible. Getting clean water for drinking, cooking, and cleaning can be difficult and dangerous. It can require a significant amount of time dedicated to walking, waiting in line, and a large amount of physical exertion with heavy lifting of containers that transport and store the water. Traditionally, women and children carry containers on their head and/or in their arms and may need to walk several kilometers a day or more to fetch water. The large amount of time spent obtaining water can deter children from involvement in school or other educational activities, and can also prevent women from carrying out domestic work and/or working to generate an income. Furthermore, the physical exertion can take a toll on one's health, causing issues such as spinal injuries, joint pain, and complications during childbirth.

SUMMARY OF THE DISCLOSURE

A solution designed to alleviate some or all of the issues described above is a rolling water container system. The rolling water container system can be used to store, transport and dispense the water, among other things. The rolling water container system can include a drum, barrel or other circular container that can be filled with water and then rolled along the ground. It can be made of a sturdy outer material, such as plastic, and can have a much larger capacity (e.g., five times as much water) as compared to traditional containers that are transported on top of the head or carried in one's arms. This can allow for fewer trips to the water source, and the time saved can instead be spent in school, carrying out domestic work, or at a job where income can be produced. The rolling water container system not only can allow for a larger amount of water to be transported and stored, but can also reduce the strain on the human body that would otherwise be generated by the heavy weight of the container on top of the head or supported by the arms. This can lead to fewer health issues and body injuries.

The design of the rolling water container system can be important in addressing some of the issues that can arise and goals to be achieved in utilizing such a system. These issues and goals can include ensuring that the drum of the rolling water container system is suitable for one or more of the functions of transportation, purification, dispensing and storage. It should be easy to transport, and water from the drum should be easily accessible. Prevention of the loss of water when the drum is filled can also be very important. Additionally, other potential issues with the drum can include the ease of being able to clean the wheel and preventing contamination of the water contained in the drum. This can reduce the number of health issues from waterborne illnesses. In some situations, it may not be possible for the drum to be brought close to the water source. For example, the drum may only be able to be brought to the edge of an embankment, perhaps five or more feet above a water source such as a lake or stream. In such a situation, a small hand-held container may be needed to capture water and bring it manually to the drum. Numerous fillings of the hand-held container and numerous repetitive trips between the water source and the drum may be necessary to fill the drum.

Accordingly, in some examples of the disclosure, the drum can contain reversed container grips for ease of lifting the drum. In some examples, the drum can be designed with shoulders on the sides to accommodate wheels or treads for ease in rolling. In some examples, the drum can be designed with a pour assisted gutter to help retrieve as much water as possible in the drum when the drum is near empty. In some examples, the drum can have a centrally mounted lid allowing for better access to the inside of the drum. In some examples, the drum design can allow for a stable lean and staggered pour for easy access and controlled pour of the water for dispensing. In some examples, a bearing as a bushing on the end of the handles can be employed for better handle protection. In some examples, the handles can be attached to wheels that are then used as hubs that lock into the drum. In some examples, the cap can be designed with an additional, smaller cap inside. In some examples, the lid can be designed with drum clamp and a seal. In some examples, the handle can include a spring handle mount. In some examples, the handle can include a locking belt. In some examples, the rolling water container system can include hose and pump attachments. In some examples, the rolling water container system can include an embedded filtration system. In some examples, the filtration receptacle can employ fins. In some examples, the receptacle can have multiple reservoirs. In some examples, a base, ramp, and/or one or more taps can be used to retrieve water from the receptacle. In some examples, the rolling water container system can include a braking system.

BRIEF DESCRIPTION OF THE DRAWINGS

FIG. 16 illustrates a cross sectional view of a drum with a filter coupled to an inlet according to some examples of the disclosure.

FIG. 17 illustrates a plan view of a drum with an unfiltered water inlet and a filtered water outlet according to some examples of the disclosure.

FIG. 18 illustrates another cross sectional view of a drum with a sack of filtering material according to some examples.

FIG. 19 illustrates still another cross sectional view of a drum with a sack of filtering material according to some examples of the disclosure.

FIGS. 28a-28j illustrate different forms for the drum according to some examples of the disclosure.

FIG. 31 illustrates different components and configurations for a drum according to some examples of the disclosure.

FIGS. 32a-32m illustrate different forms for the drum according to some examples of the disclosure.

DETAILED DESCRIPTION

In the following description, reference is made to the accompanying drawings which form a part hereof, and in which it is shown by way of illustration specific examples that can be practiced. It is to be understood that other examples can be used and structural changes can be made without departing from the scope of the disclosed examples.

This relates to a rolling container system that can, in various examples, be used to gather, transport, filter, store and dispense liquids such as water. The rolling water container system according to various examples of the disclosure can, among other things, provide easier transportation of the water, lifting of the water container or drum, and accessibility to the inside of the drum. Additional features can assist with conservation of water by preventing water leakage from the drum and providing for near-complete emptying of the drum. Further features can include handles with greater mechanical strength. The rolling water container system can include other features and can perform other functions described in further detail below.

Figure 1:
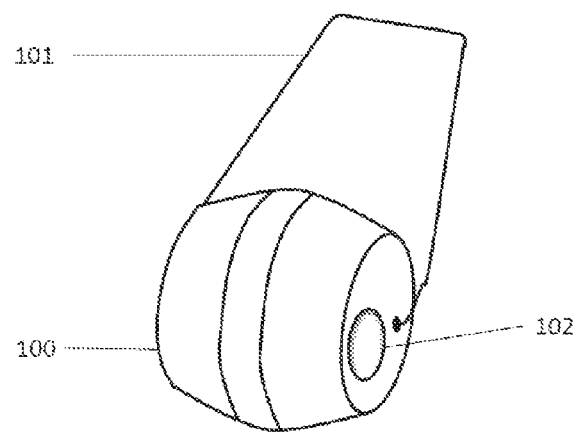
FIG. 1 illustrates a rolling water container system according to some examples of the disclosure.

FIG. 1 illustrates a rolling water container system according to some examples of the disclosure. The rolling water container system can comprise a drum 100 with a transportation handle 101 attached to the sides. The entire apparatus can be pushed or pulled using the transportation handle while the drum rolls along the ground. The transportation handle can be attached to the drum during transport and also detached from the drum to be used during storage or while the drum is being filled with water or emptied out. Access to the inside of the drum for filling, emptying, or cleaning can be done using the cap 102, which can be sealed to prevent water from leaking.

Figure 2:
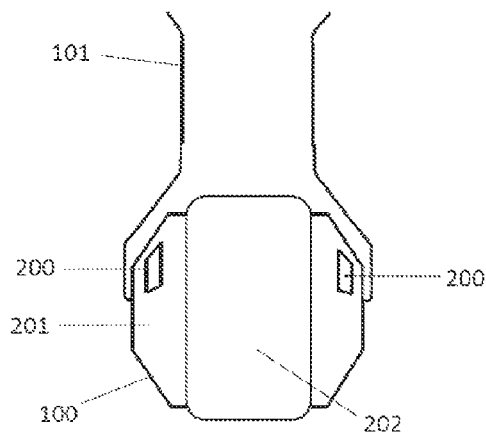
FIG. 2 illustrates a rolling water container system with a drum oriented on its side for transportation mode and reversed container grips located on the sides of the drum according to some examples of the disclosure.

In some examples, the drum can be designed with one or more recessed handles. Recessed handles are shown in FIG. 2 with the rolling water system oriented in transportation mode with the handle 101 attached to the drum 100 according to some examples of the disclosure. Recessed handles 200 can be located on at least one or both the sides 201 of the drum and an optional recessed handle (not shown in FIG. 2) may be located at the center body 202 of the drum. These recessed handles can be useful for handling the wheel, whether for emptying the water or lifting up the wheel. The handles can be molded to fit the size of the user's hands and can be indented or recessed to prevent the need for extra parts to be attached to the wheel. Extra parts can lead to extra costs and also can interfere with transportation or rolling. The recessed handles 200 are shown to be out of the way of the transportation handle 101 in the example of FIG. 2. The location and number of recessed handles can be selected for dual use when the wheel is oriented upright for storage, and also on its side for transportation.

Figure 3:
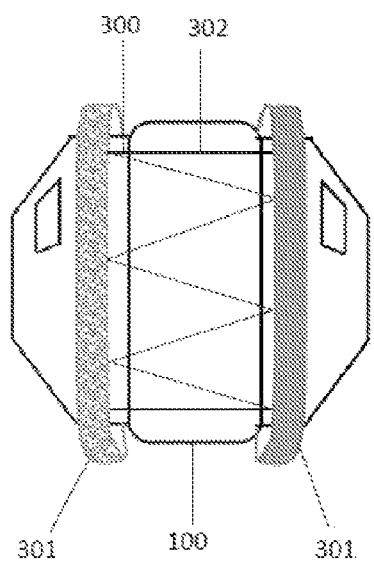
FIG. 3 illustrates a drum shown with attached treaded tires according to some examples of the disclosure.

In some examples, the design of the drum can be designed to have a shelf or shoulder on the sides of the drum to support tires, as shown in FIG. 3. The shelves 300 can be flat and designed to allow for tires 301 to be seated on the shelf of both sides of the drum. This can provide several benefits, including ease in transportation and rolling. In particular, the tires 301 can protrude far enough from the drum to be the only area of contact between the drum and the rolling surface, which can decrease rolling friction and making pushing or pulling the drum easier. To hold the tires together, a net, band, or belt 302 can be used that secures the two tires to each other. The shelf on the drum can be flat to allow for easier cleaning of the interior surfaces of drum, but in other examples can include protruding grooves (e.g., rails or tracks) or slopes to better hold the tire in a secure location.

Figure 4:
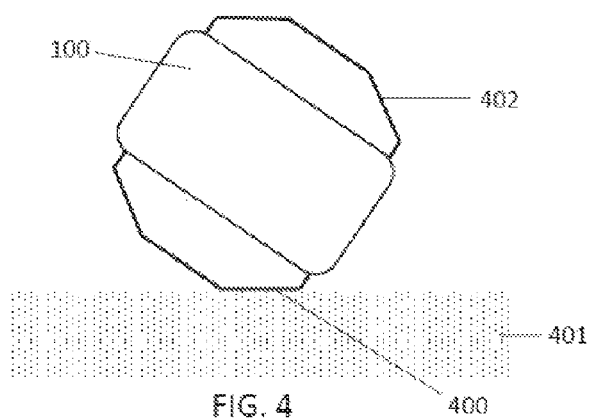
FIG. 4 illustrates a drum oriented for storage mode and leaned against one edge for a stable lean and a staggered pour from an opening in the drum (not shown) according to some examples of the disclosure.

One potential problem with the drum can be the ability to control the amount and flow rate of the water dispensed, and the position of the drum while doing so, as a water-filled drum can be quite heavy. One solution to this is a stable lean and staggered pour. FIG. 4 shows the drum 100 oriented in a storage mode according to some examples of the disclosure. A side or shoulder 400 of the drum can be tapered or angled to allow for the drum to balance and rest on the angled shoulder 400 when placed on a flat surface 401 such as a table or the ground. The cap can be recessed into the other side of the angled shoulder 402, and can allow easier access to the water when the wheel is being stored. For example, when full, the drum 100 can rest on its flat end (where the handle attaches), and a slight tilt of the drum (clockwise in FIG. 4) can cause water to pour from the cap on shoulder 402. As the drum partially empties, a further tilt of the drum (further clockwise in FIG. 4) may be necessary to get water to pour from the cap, but the shoulder 400 makes this further tilt easier to control. The drum can even rest in a storage mode on shoulder 400 as shown in FIG. 4. As the drum continues to empty, the drum may need to be tilted fully on its rolling side to get water to pour from the cap, but the transition from the drum resting on shoulder 400 to resting on its side is made less abrupt and more controllable with shoulder 400 in place. In other words, the angled shoulder 400 can provide a stable transition point and can facilitate a more controllable, staggered pour. Even when not pouring water from the drum, the shoulder 400 can provide for an easy transition between a storage mode and a rolling mode without having to lift it.

Figure 5:
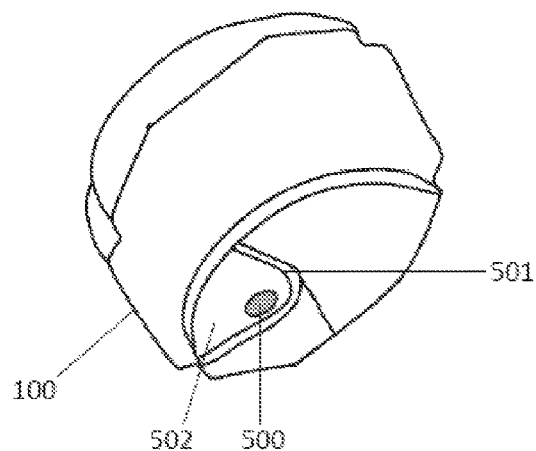
FIG. 5 illustrates a slice of a drum showing the inside of the drum designed with a pour assist gutter according to some examples of the disclosure.

Another potential problem with the rolling water system can be the trapping of water in interior crevices when the drum is nearly empty. This can force users to waste the last remaining droplets or use desperate means to retrieve the water, such as a sponge. A pour assist gutter can help alleviate this issue. FIG. 5 shows a slice of the drum 100 and its interior walls according to some examples of the disclosure. The opening into the drum 500 is shown at the bottom with the drum in an orientation typical of when the last contents of the drum are being removed. A lip 501 can prevent droplets of water from traveling away from the vicinity of the opening, and a shelf 502 can collect the last remaining water and can be utilized to guide the water towards the opening 500. The shelf can be sloped or flat. The entire pour assist gutter can be recessed to prevent it from interfering during transportation.

Figure 6:
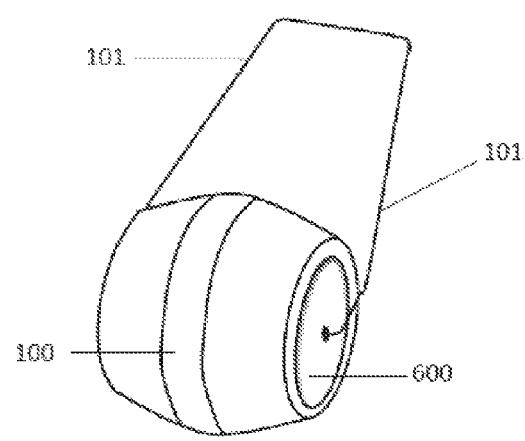
FIG. 6 illustrates a rolling water container system with a drum oriented on its side for transportation mode with a centrally mounted lid on the side of the drum according to some examples of the disclosure.

In some examples, the cap 102 shown in FIG. 1 can be replaced with a centrally mounted lid 600, as shown in FIG. 6 according to some examples of the disclosure. The centrally mounted lid can assist in allowing better access to the inside of the wheel. The lid can be larger than the cap 102 in FIG. 1. This can be ideal for situations such as cleaning or situations that benefit from having one or both hands inside the drum, such as using a ladle or cup to scoop water out of the drum. The lid can be either threaded or non-threaded. One advantage of the former can be improved control and ease of manipulation, whereas simplicity can be one advantage of the latter. Additionally, a circular clamp can be used to eliminate the requirement for a threaded lid.

Figure 7:
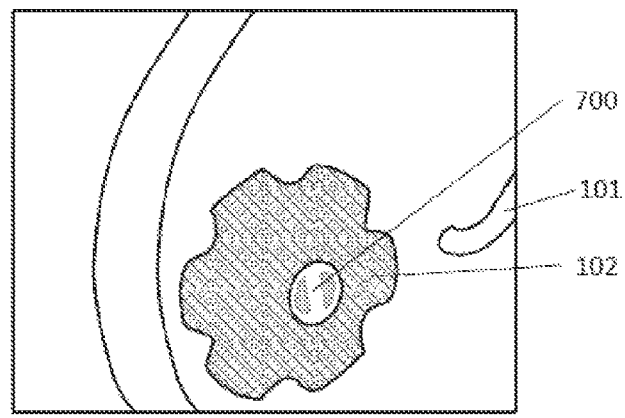
FIG. 7 illustrates a cap on the side of the drum containing a second, smaller cap according to some examples of the disclosure.

The cap 102 presented in FIG. 1 or the centrally mounted lid 600 in FIG. 6 can be used for both retrieving water for drinking, cooking or other purposes, and in some instances can also to allow the user to reach inside the drum for various purposes. However, this can lead to issues with contamination. For example, the user may want protection from external objects when the drum is used for drinking but also access to the inside of the drum when cleaning. This can be solved using a cap in a cap design. FIG. 7 shows a larger view of the side of the drum when the rolling water container system is in transportation mode according to some examples of the disclosure. The cap 102 is shown located near the attached transportation handle 101. The cap can be used to access the inside of the drum for cleaning, while it contains a smaller cap 700 that can be used only for pouring or filling. In some examples, the smaller cap can be incorporated into the centrally mounted lid.

Figure 8:
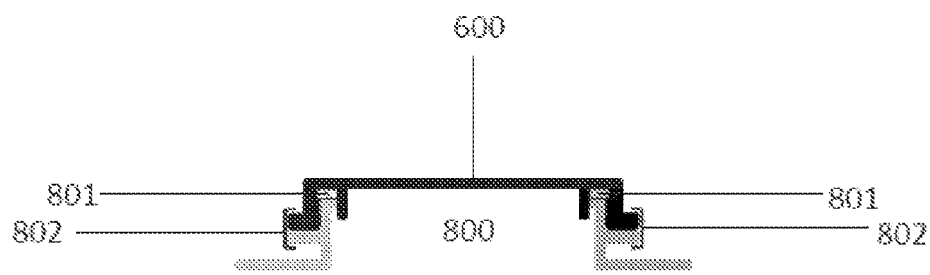
FIG. 8 illustrates a cross-section of the side of a drum and lid showing a seal recessed inside the lid, latched closed with a drum clamp according to some examples of the disclosure.

One potential problem with the rolling water container system can be leaks, especially during transportation mode. The water loss due to leaks can lead to a potential shortage of water supply to the family and extra trips to the water source. An alternative example incorporates a seal that can be made of a compressible material, such as rubber. FIG. 8 shows a cross-section of the lid 600 and opening of the drum 800, located on the side of the drum, according to some examples of the disclosure. The lid can employ a groove to hold a seal 801 to prevent water from leaking out of the drum. This non-threaded example of FIG. 8 can help to prevent damage to a seal that can occur such as when the user overtightens a threaded seal, and instead a drum clamp 802 can be used. To reduce costs, the lid design of FIG. 8 can be specifically sized such that the seal and clamp components can be inexpensive, readily available household products such as a drum clamp and a pressure cooker seal. The drum clamp can then be positioned around the lid and latched shut to the opening of the drum. This example can also help make it easier for the lid to open and close, especially to accommodate varying sized hands, a problem that can arise in threaded seals.

Figure 9:
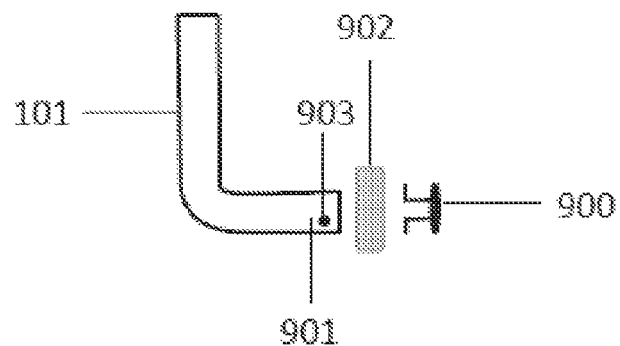
FIG. 9 illustrates a close up view of one end of a handle with a bearing used as a bushing according to some examples of the disclosure.

While previous examples have addressed enhancing the capabilities of the drum, the structural strength of the handle can be important as well. The handle should be able to withstand all the pulling and pushing forces applied during transportation. Further the handle should be easy to remove and attach to the drum while also not dislocating while being used. In some examples, the handle can use a bearing as the bushing. This is shown in FIG. 9 according to some examples of the disclosure. A round disc 900 can be used to protect the end 901 of the transportation handle 101 from either damage to external objects and protecting the user from being harmed by the sharp edges of the handle. The bearing 902 can then lock into the round disc with the bearing snapping into the small holes located at the end of the handle 903.

Figures 10A, 10B:
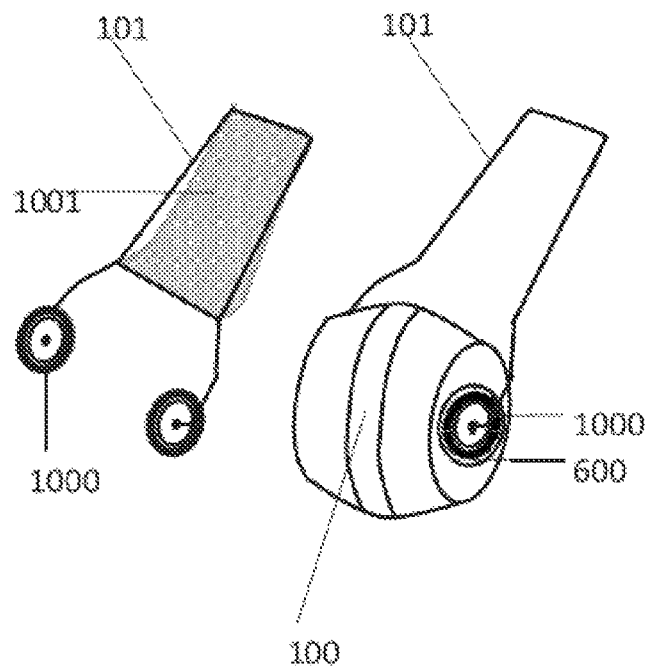
FIG. 10a illustrates a removable handle for the rolling water container system with wheels attached to the end of the removable handle, allowing for separate usage of the handle apart from the drum according to some examples of the disclosure.
FIG. 10b illustrates a rolling water container system with a drum oriented on its side for transportation mode and the removable handle of FIG. 10a attached with wheels locked into the drum according to some examples of the disclosure.

The rolling water container system shown in FIG. 1 has its transportation handle connected directly to the drum. The issue with this configuration is that the transportation handle end can become susceptible to mechanical stresses and pressure at that one point of contact, leading to a weaker handle that could potentially break or lose its structural integrity. An alternative to this can be using wheels as hubs and attaching the wheels to the ends of the transportation handle, as shown in FIG. 10*a* and FIG. 10*b* according to some examples of the disclosure. The ends of the transportation handle 101 can be connected to wheels 1000, which can then directly lock into the lid 600. The mechanical stresses, pressure and load between the handle and drum can then be spread over the diameter of the wheel, making the handle less vulnerable to damage. Furthermore, in some examples, the handle can be used for multiple purposes. When the drum is not attached, a piece of material 1001 can be attached to the handle apparatus to be used as a small cart or dolly. In another example, suspension can be incorporated into the wheel system.

Figure 11:
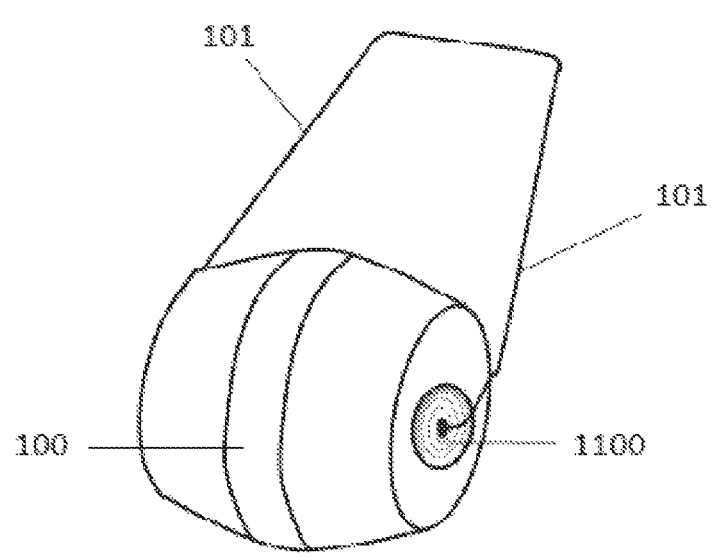
FIG. 11 illustrates a rolling water container system with a drum oriented on its side for transportation mode including a spring handle mount according to some examples of the disclosure.

An additional solution to the problem of pressure on the ends of the handle can be to use a spring handle mount. The purpose of the spring handle mount can be to transfer pressure or load away from the handle and displace it to the spring. FIG. 11 illustrates this with the rolling water container system in transportation mode and end of the handle 101 connected to the spring handle mount 1100 according to some examples of the disclosure. This can be for situations when the user pushes or pulls on the handle, causing the force to not be applied directly to the plastic lid. Without the spring handle mount, the lid and the handle can be more susceptible to damage.

Figure 12:
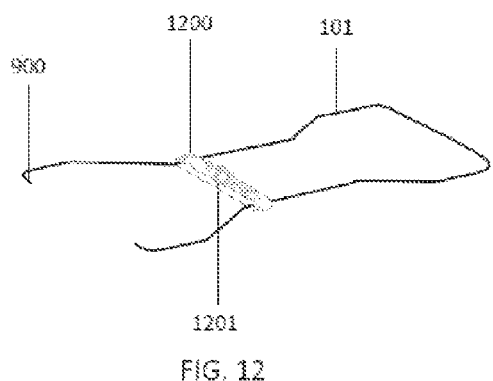
FIG. 12 illustrates a handle not attached to the rolling water container system with a handle belt locked with a clasp according to some examples of the disclosure.
Figure 13:
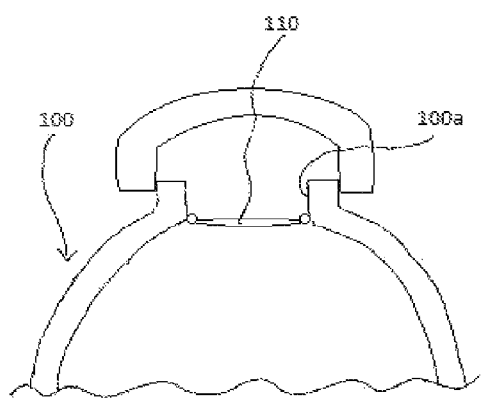
FIG. 13 illustrates a cross sectional view of a drum with a filter coupled to an inlet according to some examples of the disclosure.
Figure 14:
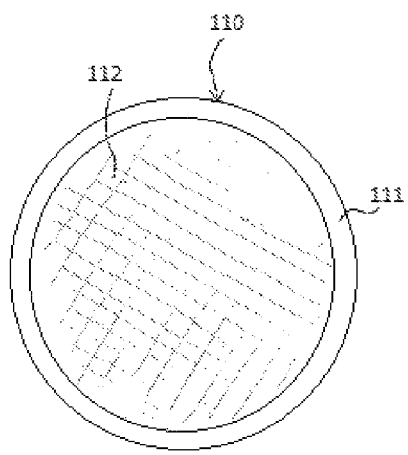
FIG. 14 illustrates a plan view of a filter for a drum inlet according to some examples of the disclosure.

While the user is moving the drum, the transportation handle can be flimsy and lose its shape. Furthermore, the transportation handle can also pop out of the socket in the side of the wheel. To alleviate these issues and provide better stability and strength to the transportation handle, a handle lock belt can be used. FIG. 12 shows a transportation handle 101 with ends 900 used to attach to the drum according to some examples of the disclosure. The handle lock belt 1200 can keep the handle in the appropriate form when the drum is being rolled. A clasp 1201 can be located on the belt to tighten the transportation handle for retaining its shape, and to release the tension from the belt when the transportation handle is removed. In some examples, the belt can be a clamp or bag.

Where it is desirable to filter water before the water is poured into the drum, a filter can be placed on the drum so that the water can be filtered while being poured into the drum. FIG. 13 illustrates an example of such a drum 100 having a filter 110 that can be detachably coupled to the inlet 100*a* of the drum 100 according to some examples of the disclosure. FIG. 14 is a plan view of the filter 110 according to some examples of the disclosure. The filter 110 can have a rim 111 and a mesh 112. The rim 111 can have the shape of the contour of the inlet 100*a* of the drum 100 and can be covered with a rubber ring so that the filter 110 can be fitted into the inlet 100*a* without a gap. The filter 110 can be detached from the inlet 100*a* for cleaning.

The mesh 112 can be formed from various materials. For example, nylon mesh film is cost effective and durable. Also, the pore size of nylon mesh film can be as small as, for example, 10 μm. The mesh film can alternatively be formed of other polymers, such as polyester.

Figure 15:
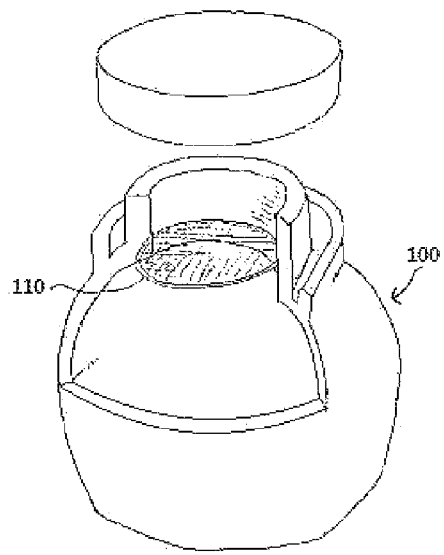
FIG. 15 illustrates a perspective view of a drum with a filter coupled to an inlet according to some examples of the disclosure.
Figure 20:
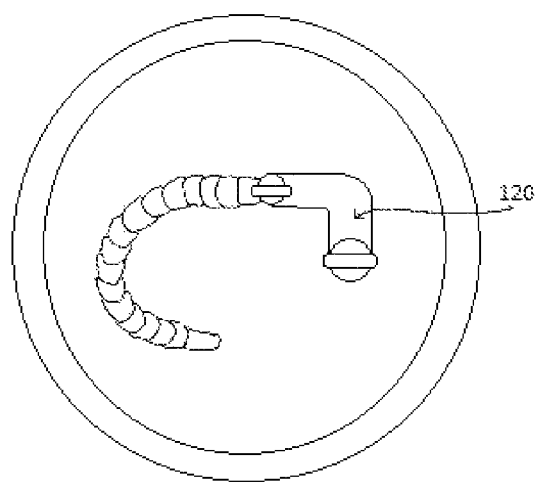
FIG. 20 illustrates a plan view of a pump for a drum according to some examples of the disclosure.
Figure 21:
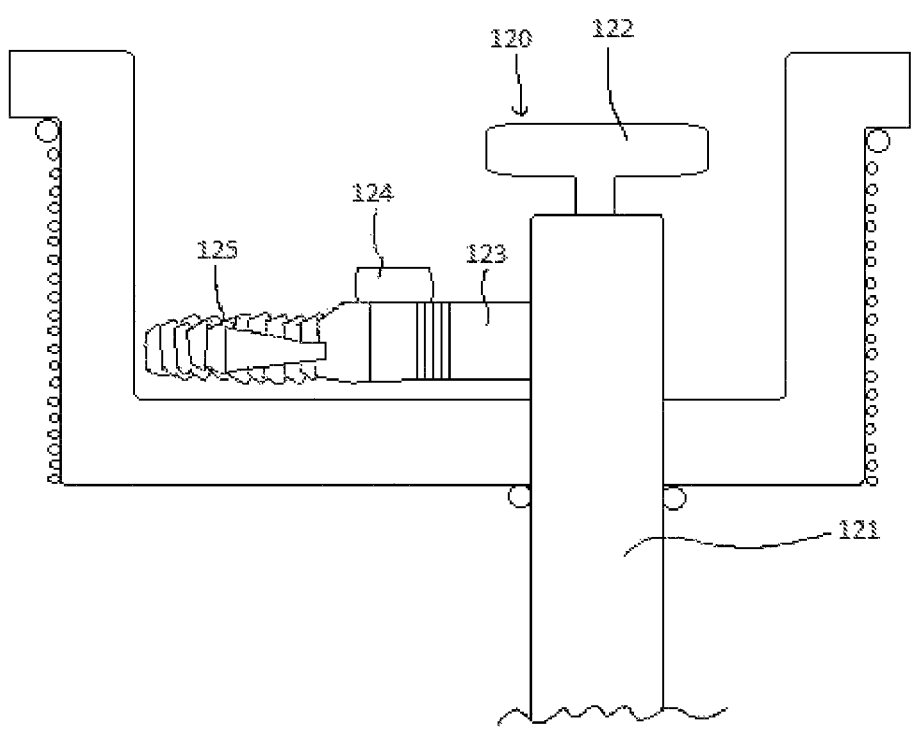
FIG. 21 illustrates a cross sectional view of a pump for a drum according to some examples of the disclosure.
Figure 22:
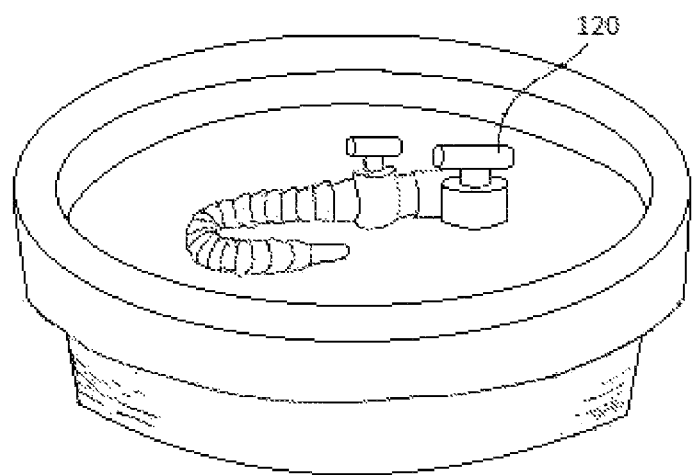
FIG. 22 illustrates a perspective view of a pump for a drum according to some examples of the disclosure.
Figure 23:
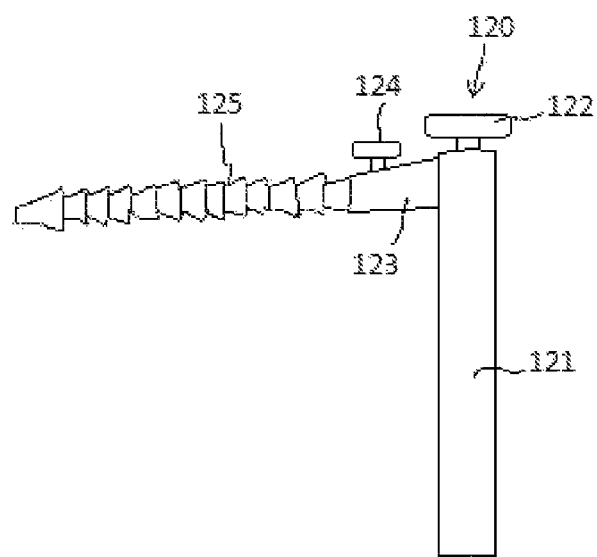
FIG. 23 illustrates a side view of a pump for use with a drum according to some examples of the disclosure.

While the filter 110 has a planar shape as shown in the examples of FIG. 14 and FIG. 15, the filter can also be shaped as a bag as shown in FIG. 16 according to some examples of the disclosure. The bag-shaped filter 120 can be kept inside the drum 100 so that the filtered water can separated from unfiltered water while in the drum 100. The filter 120 can also have a mesh 122 made of polymer such as nylon or polyester.

It is also possible to structure the drum 100 so that the user can receive only filtered water from a dedicated outlet. As shown in FIG. 17, according to some examples of the disclosure, the drum 200 can have, besides an inlet and a lid 200*b* which is coupled to the inlet, a filtered water outlet 200*c* on the other side of the barrel-shaped body of the drum 200. When the user pours in water, the user does so by opening the lid 200*b* and pouring the water through the inlet. When the user receives water, he/she uses the drinking outlet 200*c*. The water wheel 200 can also have a bag-shaped filter inside, so that filtered water can be separated from unfiltered water inside the water wheel. In this way, only filtered water can come out of the outlet 200*c*.

It is also possible to employ more elaborate filtering mechanisms to augment the filtering capacity of the drum. For instance, instead of a filter made only of mesh film, the drum can have a chamber filled with activated carbon or ceramic. Activated carbon is known to absorb many compounds including toxic compounds. For instance, such a chamber can be formed with a sack made of polymer film (such as nylon film or polyester film), as shown in FIG. 18 or plastic container as shown in FIG. 19 according to some examples of the disclosure. The level of granularity of activated carbon or ceramic can depend on the desired water purification capacity.

In the examples of FIG. 18 and FIG. 19, the water can be filtered through the chamber 320 and 340 through gravity, in other words, by placing the water wheel in an orientation so that the unfiltered water is above the chamber 320 and 340. Alternatively, it is possible to force the water through the chamber with a pump.

Such pump 120, an example of which is illustrated in FIGS. 20-23 according to some examples of the disclosure, can have an elongated cylinder 121, a handle 122, a connector 123, a valve 124, and a hose 125. The cylinder 121, through which the handle 122 can be inserted, can be inserted inside the drum. Such a pump can be, for instance, a manual suction pump, a motor-drive rotor pump, or any publicly known pump.

The cylinder 121 can be inserted through the drum via the filtered water outlet for contact with water if the filtered water is separated from the unfiltered water inside the water wheel. By placing the drum horizontally and keeping the filtered water and unfiltered water hydraulically connected, the unfiltered water can be pulled through the filter with the suction force applied by the pump 120.

If the water wheel only contains filtered water, the cylinder 121 can be inserted through a hole that is created on the lid. The water can be pumped out of the water wheel through the pump 120 and dispensed through hose 125.

Figure 24:
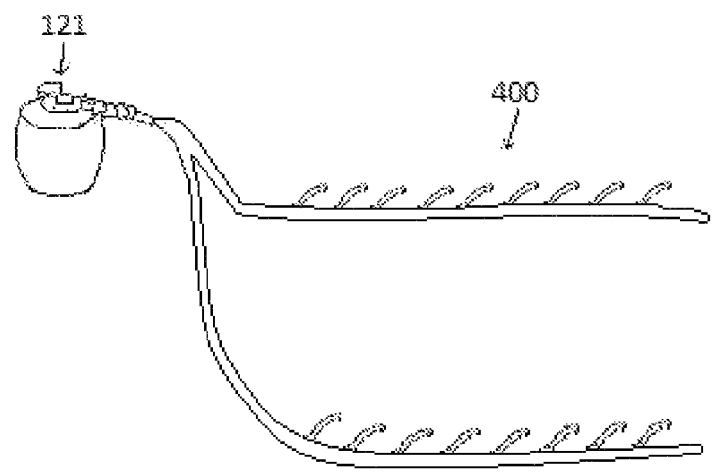
FIG. 24 illustrates a perspective view of a drum having a pump with a drip irrigation system according to some examples of the disclosure.

The pump 121 can be connected to a drip irrigation system 400 such as the one shown in FIG. 24 according to some examples of the disclosure, to enable the irrigation of small gardens. The type of irrigation system is not limited to the one shown in FIG. 24, and any known irrigation system can be used with some examples of the disclosure. In addition, instead of drawing irrigation water out of the drum using the pump as shown in FIG. 24, the irrigation lines can be connected to an outlet at the botton of the drum (in a resting position), and gravity can draw the water out of the drum and through the irrigation lines.

Figure 25:
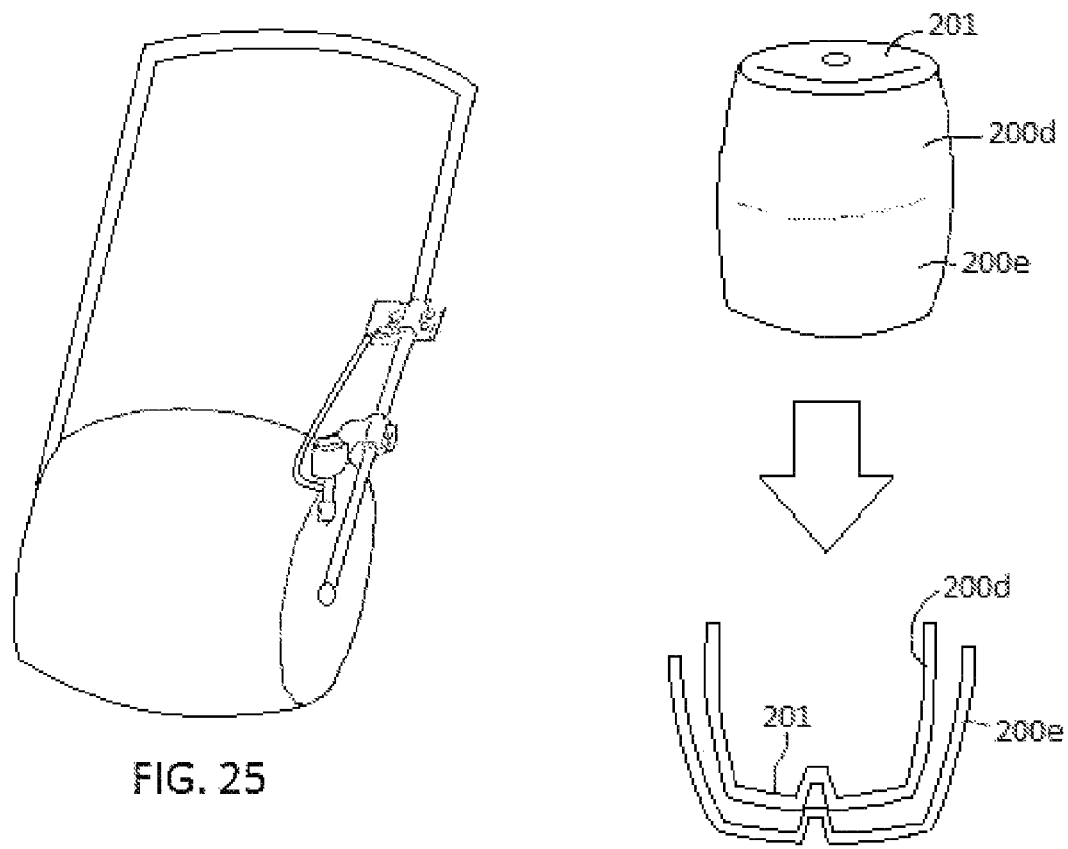
FIG. 25 illustrates a perspective view of a drum with a charger according to some examples of the disclosure.
Figure 26A:
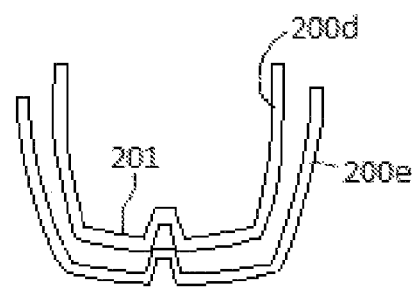
FIG. 26a illustrates perspective and cross sectional views of a stackable drum according to some examples of the disclosure.
Figure 26B:
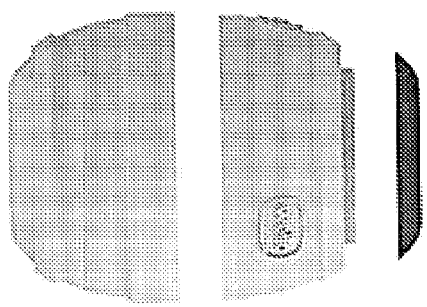
FIG. 26b illustrates an exploded side view of the components of a stackable drum according to some examples of the disclosure.
Figure 26C:
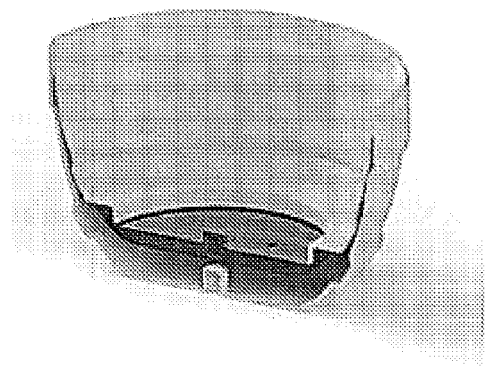
FIG. 26c illustrates a perspective view of the components of a stackable drum in a nested configuration according to some examples of the disclosure.
Figure 26D:
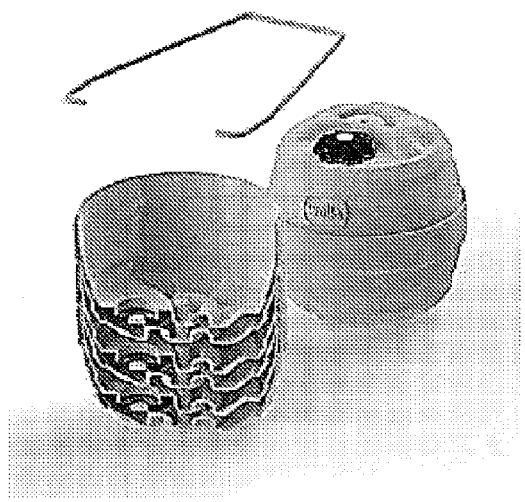
FIG. 26d illustrates a perspective view of the components of a stackable drum in a multiple-unit nested configuration according to some examples of the disclosure.
Figure 26E:
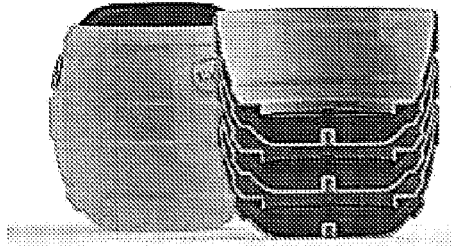
FIG. 26e illustrates a side view of the components of a stackable drum in a multiple-unit nested configuration according to some examples of the disclosure.

Also, the drum could be equipped with a charger 500 that generates and stores electricity as the drum is rotated, as shown in FIG. 25 according to some examples of the disclosure. Such a charger can have magnets placed on the side surfaces of the drum, opposite each other across the rotational center of the drum, and a wire that extends from the center of rotation of the drum. The electricity that is generated can be stored in a battery that is connected to the wire. In some examples, the charger can be rotatably mounted against the drum, so that the rotating drum can rotate the charger and generates electricity. Other chargers that can convert rotational energy from the drum to electricity can also be used.

Various applications may be possible using the electricity generated from the rotation of the drum. For instance, a cell phone charger can be connected to the battery, so that the user can charge his/her cell phone while pushing the drum around. Also, it is possible to place a heat exchanger (e.g., a cooling coil) inside the body of the drum that keeps the water cool, and connect the water chiller to the battery.

The drum can be opened and divided into half body 200d and half body 200e as shown in FIGS. 26a-26d according to some examples of the disclosure. The drum body can be formed so that each half body is stackable when unused. In other words, each half body is formed so that it can be stacked with another of the same half body. Thus, when a plurality of drums are unused, they can be stacked on top of one another to save the storage space. Compact storage of drums can also lower warehousing and shipping costs to reduce the price point of the rolling water container system.

Figure 27A:
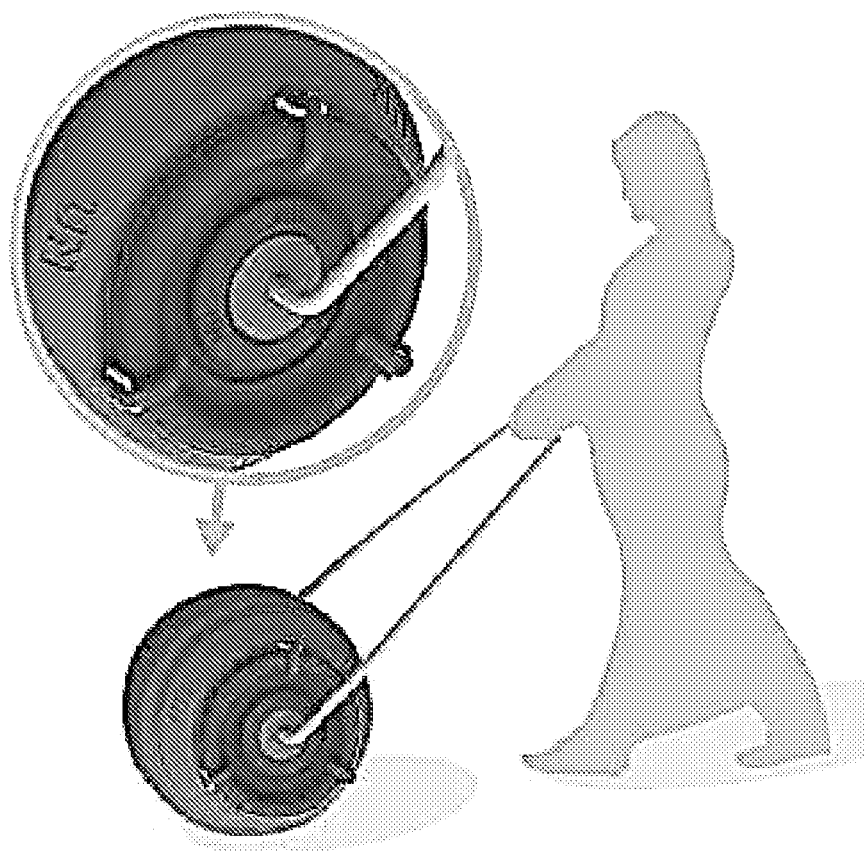
FIGS. 27a and 27b illustrate a three-way clamped lid according to some examples of the disclosure.
Figure 27B:
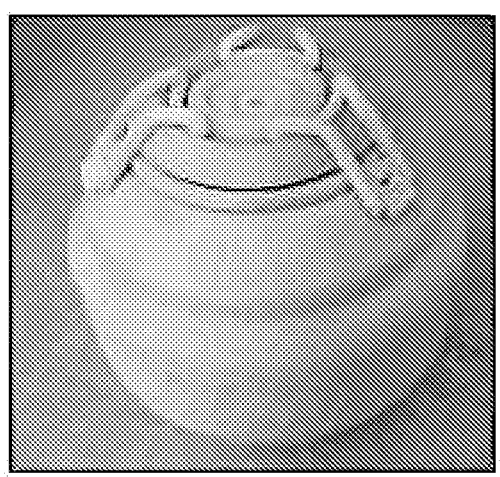
Figure 29:
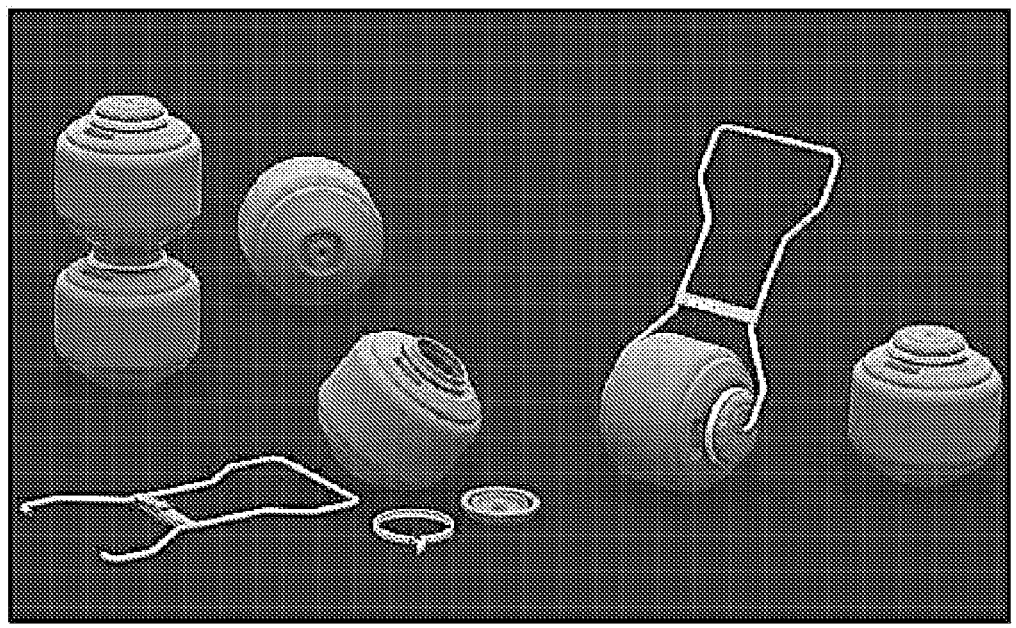
FIG. 29 illustrates different components and configurations for a drum according to some examples of the disclosure.
Figure 30:
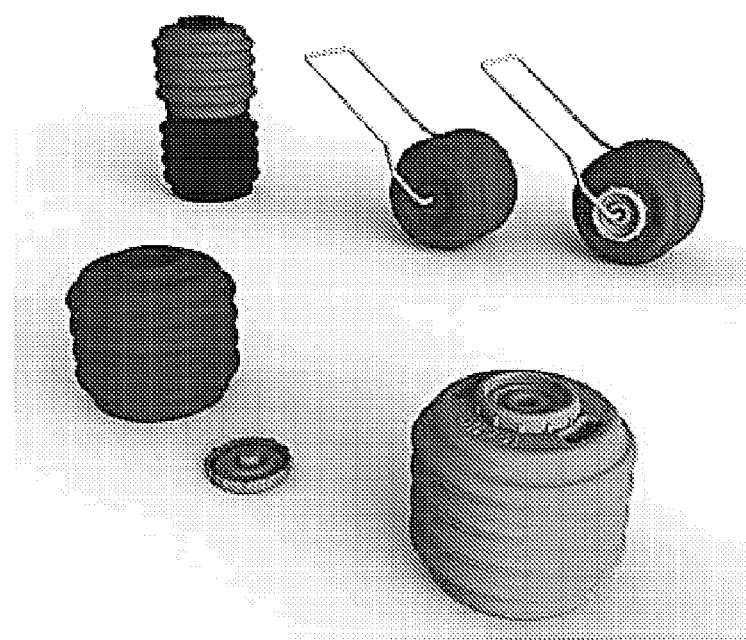
FIG. 30 illustrates different components and configurations for a drum according to some examples of the disclosure.
Figures 32F, 32G:
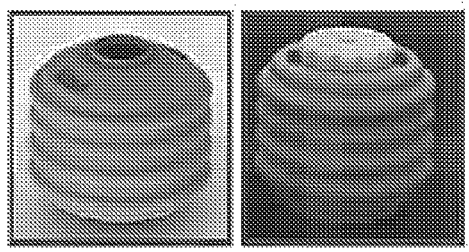
Figures 32H, 32I:
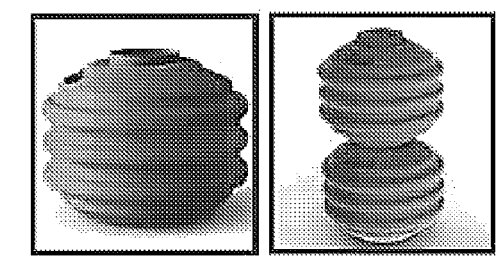
Figures 32J, 32K:
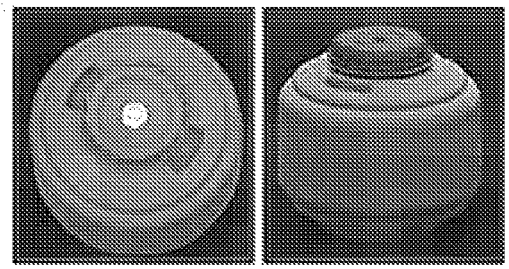
Figures 32L, 32M:
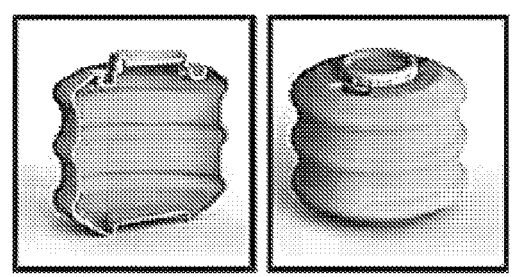

FIGS. 27a and 27b illustrate a three-way clamped lid according to some examples of the disclosure. In the examples of FIGS. 27a and 27b, a centrally mounted lid without threads can be employed a seal as in FIG. 8. However, instead of a circular drum clamp, FIGS. 27a and 27b can employ a plurality of clamps made out of materials whose dimensions are toleranced and/or utilize spring or spring-like mechanisms such that they can use the forces therein to snap into place over the lid.

FIGS. 28a-28j, FIGS. 29-31, and FIGS. 32a-32m illustrate different forms for the drum according to some examples of the disclosure. In some of the examples of FIG. 28a-28j, various corrugations, protrusions or indentations in the surface of the drums can increase the strength of the drums, and provide decreased rolling resistance. In some examples, the surfaces can be non-symmetric to conform to local aesthetics, or to provide stackability (e.g., a lid of a bottom drum can fit within the bottom end of a top drum stacked on top of the bottom drum).

Figure 33:
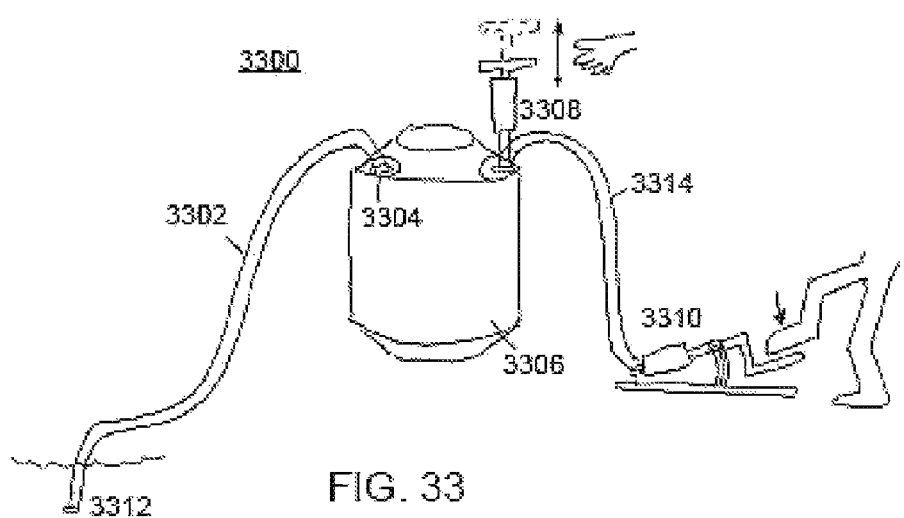
FIG. 33 illustrates a rolling water container system including hose and pump attachments according to some examples of the disclosure.

FIG. 33 illustrates an exemplary rolling water container system 3300 including hose and pump attachments according to some examples. In the example of FIG. 33, a flexible hose 3302 can be attached to a fill opening 3304 of the rolling water container 3306. The distal end 3312 of the hose 3302 can be submerged in the water source. In some examples, a hand pump 3308 can be used to draw air out of the container 3306 and pull water from the water source through the hose 3302 and into the container. In other examples, a portable foot pump 3310 can be used. The hand or foot pump can be directly coupled to the container, or attached to the container through a flexible, airtight hose 3314. In other examples not shown in FIG. 33, other types of pumps or mechanisms for drawing air out of the container can also be employed. In this manner, water can be drawn into the container, even though the container may not be close to the water source, without the need for repetitive trips using a hand-held container.

In some applications, after water has been captured within the rolling water container, it may be desirable to filter or purify the water as it is being transported back to the use site, or while at the use site.

Figure 34A:
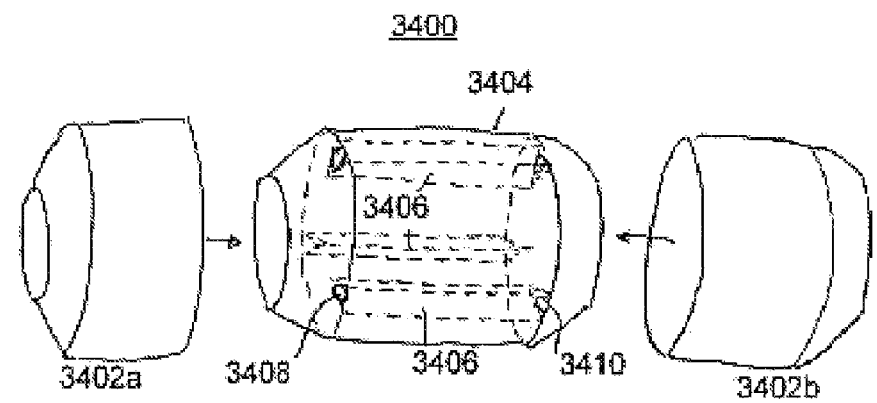
FIG. 34A illustrates a rolling water container system including an embedded filtration system according to some examples of the disclosure.

FIG. 34A illustrates an exemplary rolling water container system 3400 including an embedded filtration system according to some examples of the disclosure. In the example of FIG. 34A, system 3400 includes a basic rolling water container system, which in this example is implemented in two couplable shells 3402a and 3402b, and filtration receptacle 3404 which can fit inside the shells 3402a and 3402b. In this manner, the basic rolling water container system 3402a and 3404b can be purchased and used as a standalone system, and filtration receptacle 3404 can be purchased separately, if desired, and used with system 3400. However, in other examples, the filtration receptacle 3404 can be a rolling container itself, without needing to fit within the basic system 3402a and 3402b. It should be noted that although FIG. 34A shows shells 3402a and 3402b as being separated into two roughly equal halves, in other examples the shells can be separated in a number of different ways and can comprise any number of pieces. It should also be noted that in some examples, shells 3402a and 3402b can contain apertures, shapes and features to enable the filtration receptacle to fit within and be utilized through the shells. However, in other examples, system 3402a and 3402b can be used only as a carrier for transporting the filtration receptacle 3404 (or any other nested object), and the filtration receptacle can be removed from system 3402a and 3402b prior to accessing the water at the use site.

In some examples, filtration receptacle 3404 can have fins 3406 protruding inwardly from the interior surface of the receptacle. In the example of FIG. 34A, three fins are shown, but it should be understood that any number of fins can be employed. The fins can contain water filtration or purification membranes, filters, or other material capable of filtering and purifying water passing through it. In some examples, the filters are one-way filters that allow water to flow through the filter in substantially one direction only. In some examples, the filters can be removed for cleaning, or replaced, via apertures 3408 in the exterior of the receptacle. In some examples, the filtered water can be removed through other apertures 3410.

Figure 34B:
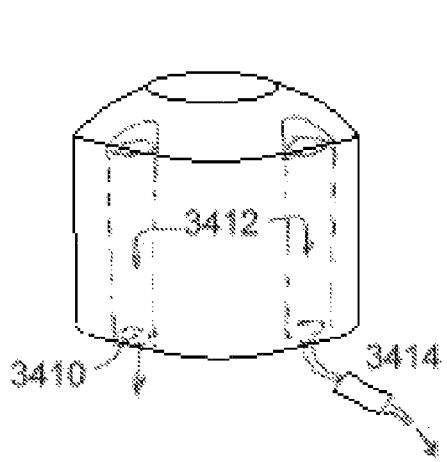
FIG. 34B is a perspective view of the rolling water container system of FIG. 34A when oriented in an example use configuration according to some examples of the disclosure.

FIG. 34B is a perspective view of the exemplary receptacle 3404 of FIG. 34A when oriented in an example use configuration. In the example of FIG. 34B, gravity can force water through fins 3406 and filters in the direction indicated by arrows 3412, and can be removed via apertures 3410. In some examples, alternative or additional filters can be employed at apertures 3410 or separate from the apertures in in-line filters 3414.

Figure 35:
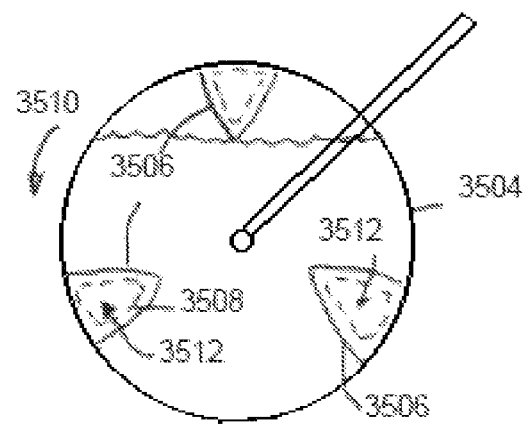
FIG. 35 is a side view of a filtration receptacle with fins according to some examples of the disclosure.

FIG. 35 is a side view of an exemplary filtration receptacle 3504 with fins 3506. Filters 3508 are shown within fins 3506. In some examples, when receptacle 3504 is rolled in direction 3510, water is forced through the filters 3508 in the direction shown by arrow 3512 as the fins 3506 push against the water. Note that in some examples, fins 3506 can have filter openings on both sides, so that regardless of which direction the receptacle 3504 is rolled, water can still be forced through the filters 3508. Note that the shape and location of fins 3506 and filters 3508 in FIG. 35 is only exemplary, and that the fins and filters can take on different shapes, such as, for example, cylindrical fins attached to the interior walls of receptacle 3504 for holding cylindrical filters.

Figure 36:
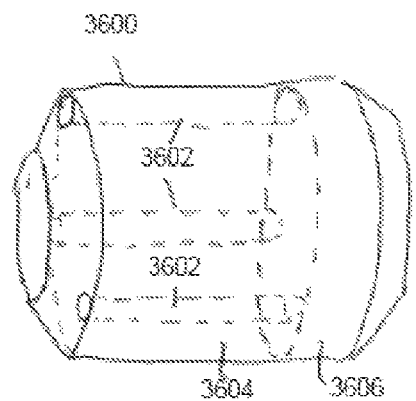
FIG. 36 illustrates a receptacle having fins within a main reservoir, and a filtered water reservoir, according to some examples of the disclosure.

Although FIG. 34A illustrates a receptacle 3404 with only a main reservoir and fins, in other examples the receptacle can have multiple reservoirs. FIG. 36 illustrates an example receptacle 3600 having fins 3602 within main reservoir 3604, and a filtered water reservoir 3606. Reservoir 3606 can be connected to fins 3602 so that water that is filtered through the fins can be collected in the reservoir. Although the receptacle 3600 in this example can result in an unbalanced roll, other benefits can be obtained from the reservoir 3606 in the filtered water receptacle as will be discussed below.

Figure 37:
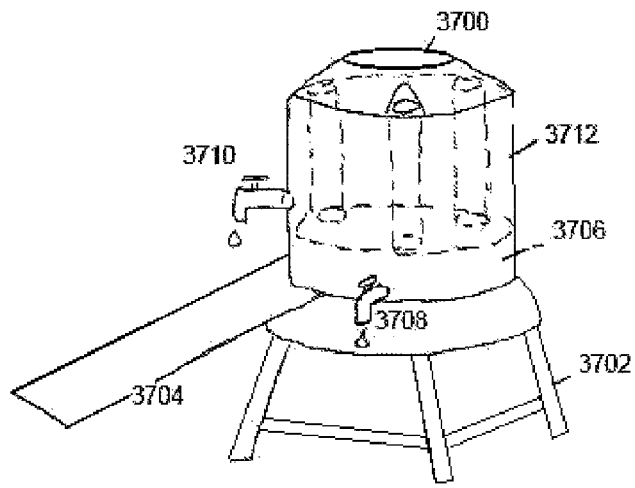
FIG. 37 is a perspective view of the receptacle of FIG. 36 in a use configuration according to some examples of the disclosure.

FIG. 37 is a perspective view of the receptacle of FIG. 36 in an example use configuration. In the example of FIG. 37, receptacle 3700 can be supported on base 3702. A ramp 3704 can also be employed to raise the receptacle 3700 into position on base 3702. In the example of FIG. 37, gravity can force water through the fins and filters into reservoir 3706, where it can be stored for immediate use. A tap 3708 can be inserted into an aperture in the side or bottom of the receptacle 3700 (as oriented in FIG. 37) to drain the filtered water from reservoir 3706. In some examples, a second tap 3710 can be inserted into another aperture in the main reservoir 3712 to drain unfiltered water from the main reservoir for use in situations where filtered water is not needed.

Figure 38A:
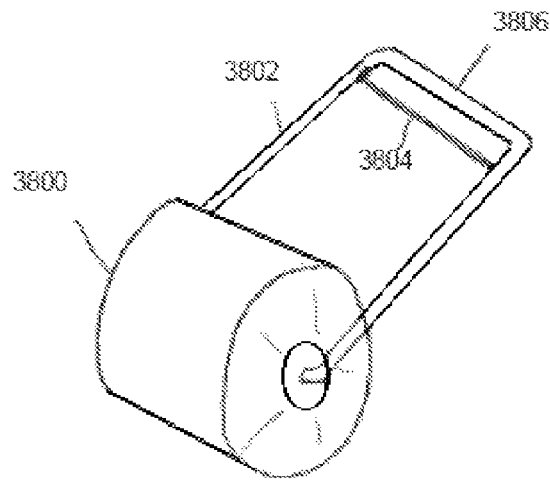
FIG. 38A illustrates a perspective view of a rolling water container with a handle and a braking system according to some examples of the disclosure.

FIG. 38A illustrates a perspective view of an exemplary rolling water container 3800 with a handle 3802 and a braking system. The braking system can be designed so that the brakes are engaged unless the user squeezes the handle 3804 to disengage the brakes. In this way, the container 3800 can be substantially immobilized unless a user actively squeezes the handle to release the brakes and commence rolling of the container.

Figure 38B:
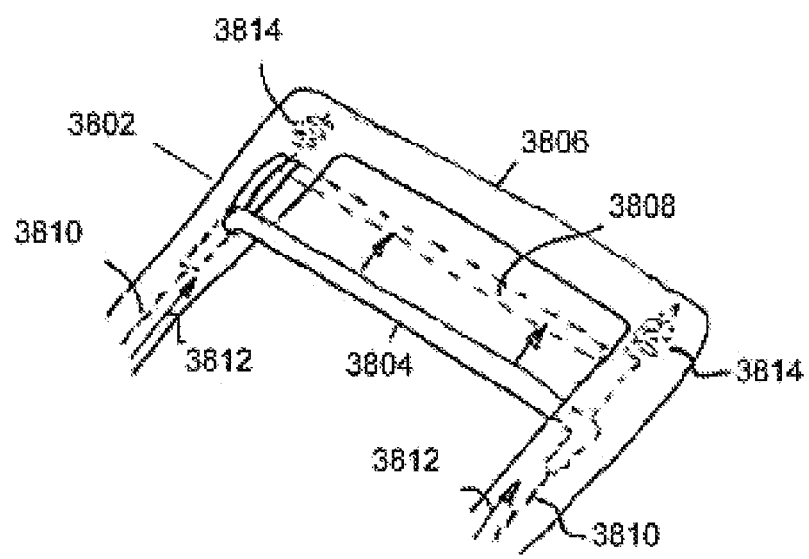
FIG. 38B shows a brake bar across the entire width of the upper portion of handle according to some examples of the disclosure.

FIG. 38B shows a brake bar 3804 across the entire width of the upper portion 3806 of handle 3802, although other brake bar configurations can also be employed. In the example of FIG. 38B, springs 3814 can be used to keep the brake bar 3804 in the engaged position unless a user affirmatively squeezes the brake bar 3804 and pulls it toward upper portion 3806 of handle 3802. If the user does squeeze the brake bar 3804 to disengage the brakes, the brake bar can be pulled to the disengaged position 3808, and while doing so, cables 3810 can be pulled in direction 3812.

Figure 38C:
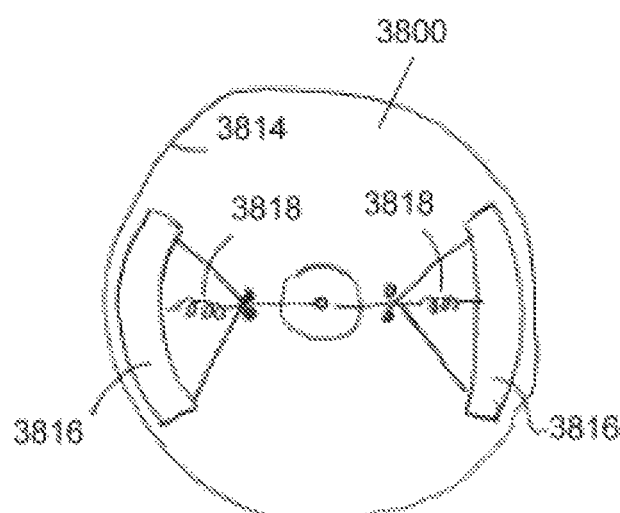
FIG. 38C shows a drum brake for use with the brake bar of FIG. 38B according to some examples of the disclosure.

FIG. 38C shows a drum brake for use with the brake bar 3804 of FIG. 38B, although in other examples different types of braking systems can be employed. In the example of FIG. 38C, a portion of the receptacle 3800 can be used as the brake drum 3814. Brake shoes 3816 can be held in an engaged position against the drum 3814 by springs 3818 until the cable (not shown) is pulled by the brake bar. It should be understood that FIGS. 38B and 38C are only exemplary and symbolic in nature, and that other implementations can be employed.

Therefore, according to the above, some examples of the disclosure are directed to a rolling liquid container, comprising: a drum configured for containing the liquid, the drum including a center body and two sides; wherein the drum includes a first shoulder between the center body at one of the sides, the first shoulder configured for supporting the drum while leaning at an angle during storage or liquid removal. Additionally or alternatively to one or more of the examples disclosed above, in some examples the rolling liquid container further comprises a second shoulder between the center body and the other of the sides; and a cap formed in the second shoulder for providing an aperture in the drum. Additionally or alternatively to one or more of the examples disclosed above, in some examples the rolling liquid container further comprises a handle rotatably coupled to the sides of drum and configured for rolling the drum along the center body. Additionally or alternatively to one or more of the examples disclosed above, in some examples the rolling liquid container further comprises shoulders between the center body and the sides for supporting rolling surfaces. Additionally or alternatively to one or more of the examples disclosed above, in some examples the rolling surfaces are tires. Additionally or alternatively to one or more of the examples disclosed above, in some examples the shoulders further comprise rails for retaining the rolling surfaces. Additionally or alternatively to one or more of the examples disclosed above, in some examples the drum further includes a pour assist gutter, the pour assist gutter including a shelf and a cap embedded in the shelf, the pour assist gutter configured for directing liquid from inside the drum onto the shelf and to the cap. Additionally or alternatively to one or more of the examples disclosed above, in some examples the pour assist gutter further includes a lip at a border of the shelf for retaining liquid on the shelf. Additionally or alternatively to one or more of the examples disclosed above, in some examples the drum further includes an inlet and a filter coupled to the inlet for filtering liquid. Additionally or alternatively to one or more of the examples disclosed above, in some examples the filter is bag-shaped. Additionally or alternatively to one or more of the examples disclosed above, in some examples the drum further includes a filtered liquid outlet. Additionally or alternatively to one or more of the examples disclosed above, in some examples the drum further includes a detachable pump for drawing liquid through the filter. Additionally or alternatively to one or more of the examples disclosed above, in some examples the rolling liquid container includes a filtration receptacle within the drum. Additionally or alternatively to one or more of the examples disclosed above, in some examples the drum is configured for separating into component parts to enable placement of the filtration receptable within the drum. Additionally or alternatively to one or more of the examples disclosed above, in some examples the drum includes internal fins, the finds containing filters and configured for forcing liquid through the filters when the drum is rotated. Additionally or alternatively to one or more of the examples disclosed above, in some examples the fins include removable filters and apertures on the fins for removing the filters. Additionally or alternatively to one or more of the examples disclosed above, in some examples the rolling liquid container further comprises a filtered water reservoir and an unfiltered water reservoir within the drum. Additionally or alternatively to one or more of the examples disclosed above, in some examples the rolling liquid container further comprises a detachable first tap for draining water from the filtered water reservoir and a detachable second tap for draining water from the unfiltered water reservoir. Additionally or alternatively to one or more of the examples disclosed above, in some examples the handle is detachable and the drum is configured for placement in at least one of a storage and dispensing configuration when the handle is detached. Additionally or alternatively to one or more of the examples disclosed above, in some examples the rolling liquid container further comprises a braking system in the handle, the braking system including a lever and configured for immobilizing the drum unless the lever is engaged. Additionally or alternatively to one or more of the examples disclosed above, in some examples the handle is coupled to wheels configured as hubs for the drum. Additionally or alternatively to one or more of the examples disclosed above, in some examples the handle is configured for use as a dolly when detached from the drum. Additionally or alternatively to one or more of the examples disclosed above, in some examples the handles are coupled to hub torsion springs. Additionally or alternatively to one or more of the examples disclosed above, in some examples the rolling liquid container further comprises a first cap for the drum, the first cap oriented along a rolling axis of the drum, and a handle rotatably coupled to the first cap at the rolling axis of the drum. Additionally or alternatively to one or more of the examples disclosed above, in some examples the rolling liquid container further comprises a second cap formed within the first cap. Additionally or alternatively to one or more of the examples disclosed above, in some examples the rolling liquid container further comprises a generator rotatably coupled to the drum for generating electricity as the drum is rolled. Additionally or alternatively to one or more of the examples disclosed above, in some examples the rolling liquid container further comprises a charger coupled to the generator for charging a mobile device. Additionally or alternatively to one or more of the examples disclosed above, in some examples the rolling liquid container further comprises a refrigeration unit within the drum, the refrigeration unit coupled to the generator for cooling liquid within the drum.

Some examples of the disclosure are directed to a rolling liquid container system, comprising: a drum configured for containing the liquid, the drum including a center body and two sides; and a base for supporting the drum in a storage position; wherein the drum includes a first shoulder between the center body at one of the sides, the first shoulder configured for supporting the drum while leaning at an angle during storage or liquid removal. Additionally or alternatively to one or more of the examples disclosed above, in some examples the rolling liquid container system further comprises a ramp coupled to the base and configured for supporting the drum as the drum is rolled into position on the base.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

What is claimed is:
1. A rolling liquid container, comprising:
    a drum configured for containing the liquid, the drum including a center body and two sides;
    wherein the drum includes a first shoulder between the center body and one of the sides, the first shoulder configured for supporting the drum while leaning at an angle during storage or liquid removal; and
    the drum further including an inlet and a filter coupled to the inlet for filtering liquid.
2. The rolling liquid container of claim 1, further comprising:
    a second shoulder between the center body and the other of the sides; and
    a cap formed in the second shoulder for providing an aperture in the drum.
3. The rolling liquid container of claim 1, further comprising a handle rotatably coupled to the sides of drum and configured for rolling the drum along the center body.
4. The rolling liquid container of claim 3, wherein the handle is detachable and the drum is configured for placement in at least one of a storage and dispensing configuration when the handle is detached.
5. The rolling liquid container of claim 3, further comprising a braking system in the handle, the braking system including a lever and configured for immobilizing the drum unless the lever is engaged.
6. The rolling liquid container of claim 3, wherein the handle is coupled to wheels configured as hubs for the drum.
7. The rolling liquid container of claim 6, wherein the handle is configured for use as a dolly when detached from the drum.
8. The rolling liquid container of claim 3, wherein the handles are coupled to hub torsion springs.
9. The rolling liquid container of claim 1, the drum further including a pour assist gutter, the pour assist gutter including a shelf and a cap embedded in the shelf, the pour assist gutter configured for directing liquid from inside the drum onto the shelf and to the cap.
10. The rolling liquid container of claim 9, the pour assist gutter further including a lip at a border of the shelf for retaining liquid on the shelf.
11. The rolling liquid container of claim 1, wherein the filter is bag-shaped.
12. The rolling liquid container of claim 1, the drum further including a filtered liquid outlet.
13. The rolling liquid container of claim 1, the drum further including a detachable pump for drawing liquid through the filter.
14. The rolling liquid container of claim 1, further including a filtration receptacle within the drum.
15. The rolling liquid container of claim 14, wherein the drum is configured for separating into component parts to enable placement of the filtration receptable within the drum.
16. The rolling liquid container of claim 1, wherein the drum includes internal fins, the finds containing filters and configured for forcing liquid through the filters when the drum is rotated.
17. The rolling liquid container of claim 16, wherein the fins include removable filters and apertures on the fins for removing the filters.
18. The rolling liquid container of claim 1, further comprising a filtered water reservoir and an unfiltered water reservoir within the drum.
19. The rolling liquid container of claim 18, further comprising a detachable first tap for draining water from the filtered water reservoir and a detachable second tap for draining water from the unfiltered water reservoir.
20. The rolling liquid container of claim 1, further comprising a first cap for the drum, the first cap oriented along a rolling axis of the drum, and a handle rotatably coupled to the first cap at the rolling axis of the drum.

21. The rolling liquid container of claim 20, further comprising a second cap formed within the first cap.

22. The rolling liquid container of claim 1, further comprising a generator rotatably coupled to the drum for generating electricity as the drum is rolled.

23. The rolling liquid container of claim 22, further comprising a charger coupled to the generator for charging a mobile device.

24. The rolling liquid container of claim 22, further comprising a refrigeration unit within the drum, the refrigeration unit coupled to the generator for cooling liquid within the drum.

25. A rolling liquid container, comprising:
   a drum configured for containing the liquid, the drum including a center body and first and second sides;
   wherein the drum includes a first shoulder between the center body and the first side, the first shoulder configured for supporting the drum while leaning at an angle during storage or liquid removal; and
   wherein the drum further includes a second shoulder between the center body and the second side, the first and second shoulders configured for supporting rolling surfaces, wherein the rolling surfaces are tires.

26. The rolling liquid container of claim 25, the first and second shoulders further comprising rails for retaining the rolling surfaces.

27. A rolling liquid container system, comprising:
   a drum configured for containing the liquid, the drum including a center body and two sides;
   a base for supporting the drum in a storage position; and
   a ramp coupled to the base and configured for supporting the drum as the drum is rolled into position on the base;
   wherein the drum includes a first shoulder between the center body at one of the sides, the first shoulder configured for supporting the drum while leaning at an angle during storage or liquid removal.

* * * * *